United States Patent
Zhao et al.

(10) Patent No.: US 12,353,441 B1
(45) Date of Patent: Jul. 8, 2025

(54) SYSTEMS AND METHODS FOR MACHINE-LEARNING BASED ENTITY RESOLUTION

(71) Applicant: Ponchos & Huaraches, Inc., Bend, OR (US)

(72) Inventors: Wenzhong Zhao, San Diego, CA (US); Eric Scheie, La Mesa, CA (US); Steven Ratay, Lake Forest, IL (US); Maxwell De Jong, Worthington, OH (US); Thomas McLemore, Cedar Park, TX (US)

(73) Assignee: Ponchos & Huaraches, Inc., Bend, OR (US)

( * ) Notice: Subject to any disclaimer, the term of this patent is extended or adjusted under 35 U.S.C. 154(b) by 0 days.

(21) Appl. No.: 18/890,448

(22) Filed: Sep. 19, 2024

(51) Int. Cl.
*G06F 16/30* (2019.01)
*G06F 16/28* (2019.01)
*G06F 18/2321* (2023.01)

(52) U.S. Cl.
CPC ........ *G06F 16/285* (2019.01); *G06F 18/2321* (2023.01)

(58) Field of Classification Search
CPC .......................... G06F 16/285; G06F 18/2321
USPC .......................................................... 707/737
See application file for complete search history.

(56) References Cited

U.S. PATENT DOCUMENTS

| | | | | |
|---|---|---|---|---|
| 2022/0335348 A1* | 10/2022 | Miller | ................... | G06N 3/088 707/707 |
| 2024/0144141 A1* | 5/2024 | Cella | ................... | G06Q 30/0206 707/707 |

* cited by examiner

*Primary Examiner* — Alexandria Y Bromell
(74) *Attorney, Agent, or Firm* — Polsinelli LLP

(57) ABSTRACT

An entity resolution method and system may obtain historical entity data from one or more databases to generate an entity matrix based on a clustering of the historical entity data. The entity resolution method and system may partition the entity matrix into one or more disjointed groups of records based on multi-pass blocking of the attributes associated with the one or more entities and cluster the one or more disjointed groups of records based on one or more similarity metrics between each of the one or more disjointed groups of records. The entity resolution method and system may generate an entity graph for the one or more entities based on the clustering and may create an entity index for an entity based on the entity graph. Ultimately, the entity resolution method and system resolves an entity query of a requestor as matching the entity.

20 Claims, 8 Drawing Sheets

SYSTEMS AND METHODS FOR MACHINE-LEARNING BASED ENTITY RESOLUTION

TECHNICAL FIELD

This disclosure is related to resolving entities (e.g., online entities) and/or entity identities using machine-learning models. In particular, this disclosure relates to systems and methods for machine-learning based entity resolution that creates a complete view of information about an entity (e.g., data records, profiles) across one or more record systems and accurately resolves any incoming record or request to an identifier (e.g., unique identifier) for the entity.

BACKGROUND

A customer data platform typically centers around key functionalities like data ingestion, organization, segmentation, and activation. The core foundation for all these processes is entity resolution. Entity resolution generally refers to connecting and matching entities corresponding to the same individual or entity across different datasets or sources. However, entity resolution is challenging because of the size and quality of the data, the huge computing resources required, inconsistencies in the data, and potential for false positives and negatives. As such, there is a need for systems and methods to improve entity resolution across these large and inconsistent datasets or sources.

SUMMARY

In some aspects, the techniques described herein relate to a method including: obtaining historical entity data from one or more databases, the historical entity data associated with attributes associated with one or more entities; generating an entity matrix based on a clustering of the historical entity data; partitioning the entity matrix into one or more disjointed groups of records based on multi-pass blocking of the attributes associated with the one or more entities; clustering the one or more disjointed groups of records based on one or more similarity metrics between each of the one or more disjointed groups of records; generating an entity graph for the one or more entities based on the clustering; creating an entity index for an entity based on the entity graph; and resolving an entity query of a requestor as matching the entity.

In some aspects, the techniques described herein relate to a computing apparatus including: a processor; and a memory storing instructions that, when executed by the processor, cause the processor to: obtain historical entity data from one or more databases, the historical entity data associated with attributes associated with one or more entities; generate an entity matrix based on a clustering of the historical entity data; partition the entity matrix into one or more disjointed groups of records based on multi-pass blocking of the attributes associated with the one or more entity; cluster the one or more disjointed groups of records based on one or more similarity metrics between each of the one or more disjointed groups of records; generate an entity graph for the one or more entities based on the clustering; create an entity index for an entity based on the entity graph; and resolve an entity query of a requestor as matching the entity.

In some aspects, the techniques described herein relate to a non-transitory computer-readable storage medium, the computer-readable storage medium including instructions that when executed by a computer, cause the computer to: obtain historical entity data from one or more databases, the historical entity data associated with attributes associated with one or more entities; generate an entity matrix based on a clustering of the historical entity data; partition the entity matrix into one or more disjointed groups of records based on multi-pass blocking of the attributes associated with the one or more entities; cluster the one or more disjointed groups of records based on one or more similarity metrics between each of the one or more disjointed groups of records; generate an entity graph for the one or more entities based on the clustering; create an entity index for an entity based on the entity graph; and resolve an entity query of a requestor as matching the entity.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages are apparent from the description, the drawings and the claims.

DETAILED DESCRIPTION

Figure 1:
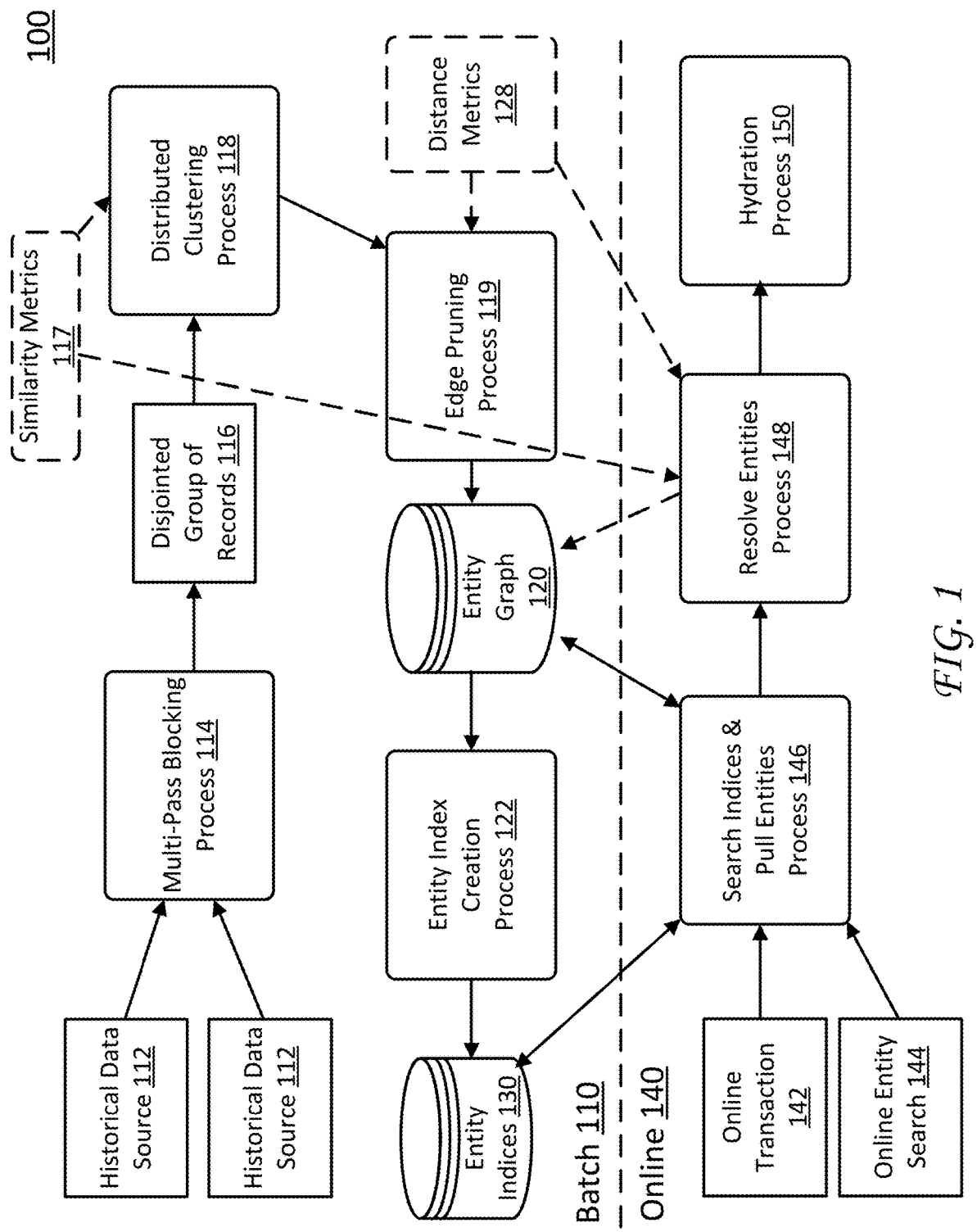
FIG. 1 illustrates a block diagram illustrating an entity resolution system architecture, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, various aspects may be practiced without these specific details. The figures and description are not intended to be restrictive.

The ensuing description provides example aspects only, and is not intended to limit the scope, applicability, or configuration of the disclosure. Rather, the ensuing description of the example aspects provides those skilled in the art with an enabling description for implementing an example aspect. It should be understood that various changes may be made in the function and arrangement of elements without departing from the spirit and scope of the application as set forth in the appended claims.

As described above, entity resolution generally refers to connecting and matching entities corresponding to the same individual or entity across different datasets or sources. Entity resolution forms the backbone for many key functionalities in various systems, including but not limited to customer data platforms (CDP), customer relationship management (CRM) systems, fraud detection and prevention systems, targeted advertising systems, healthcare and patient record systems. These key functionalities may include data ingestion, integration, organization, segmentation, and activation, to name a few. Thus, entity resolution is a critical aspect of numerous systems.

However, entity resolution is generally a very challenging process, as it involves connecting and matching entities across different datasets and sources, and requires massive amounts of computing resources to accomplish. Different datasets, records and sources generally differ in quality, consistency, and completeness, which generally make it difficult to accurately match entities. For example, records associated with a birthday of an entity may include different date formats (e.g., 1/1/2000, 01/01/2000, 1/1/00, or Jan. 1, 2000), different cultural date formats (e.g., month/day/year or day/month/year), or the entity may make a mistake in entering their birthday into one record versus another (e.g., 1/2/2000 instead of 1/1/2000). These variations in the datasets hold true for any type of data received from multiple sources. These types of variations can lead to incorrect matches (e.g., false positives), or missed matches (e.g., false negatives). Additionally, the size of datasets, as they grow larger, increase the computational complexity of the entity resolution, thereby increasing the challenge to accurately connect and match entities across different datasets or sources. As such, there is a need for methods and systems for efficiently and accurately connecting and matching entities across different datasets and sources, while accounting for these issues.

The present solution disclosed herein provides a machine-learning based entity resolution system that addresses at least these issues. In particular, the presently disclosed entity resolution system creates an accurate, complete view of an entity across different datasets and sources while seamlessly connecting the different systems of records. Moreover, the presently disclosed entity resolution system provides entities (e.g., individuals, customers, users, businesses, organizations, merchants, groups, or combinations thereof) with accurate analysis and scoring at the customer profile level and is capable of taking proper actions for any customer interaction. For example, the presently disclosed entity resolution system provides a way for a user searching for the online identity of an entity (e.g., an individual, the user, another user, a customer, a business, a organization, a merchant, a group, or a combination thereof) to access a profile of the entity and view what information is associated with the entity. The user can additionally verify the entity's identity, for instance for an online transaction or other event involving the entity. As such, the presently disclosed entity resolution system connects, matches, and/or links together (e.g., couples and/or associates) identities of (and/or other types of information associated with) an entity across various different datasets and sources efficiently and accurately.

FIG. 1 illustrates an exemplary architecture for an entity resolution system 100. In particular, the entity resolution system 100 includes a batch 110 portion and an online 140 portion. The processes of the entity resolution system 100 described herein occur on either the batch 110 portion or the online 140 portion. Generally, the batch 110 contains the process for creating an entity graph 120 and entity indices 130, while the online 140 portion contains the entity resolution requests (e.g., online transaction 142 or online entity search 144), resolving the entity (resolve entities process 148), and ultimately the hydration process 150 of pulling the entity profile and providing it to the entity who requested it.

Generally, the entity resolution system 100 includes two complementary processes on the batch 110 portion and on the online 140 portion. On the batch 110 portion, the entity resolution system 100 generally receives datasets containing historical entity data from one or more historical data source(s) 112, inputs the historical entity data into the multi-pass blocking process 114 to create the disjointed group of records 116, then applies a distributed clustering process 118 using similarity metrics 117 and an edge pruning process 119 using distance metrics 128 to create an entity graph 120. Once the entity graph 120 is created, the entity resolution system 100 proceeds to the entity index creation process 122 to ultimately create entity indices 130 for one or more individuals or entities. On the online 140 portion, a requestor (e.g., an entity and/or individual) may make an entity query and/or an identity query for purposes of an online transaction 142 for which the requestor's identity needs to be verified and resolved or an online entity search 144. Once one of these query inputs are received, the entity resolution system 100 performs a search indices and pull entities process 146 involving searching with a set of search indices and pulling the relevant entities, a resolve entities process 148, and ultimately a hydration process 150 in which the entity is resolved by verifying the requestor's identity as matching the entity and/or individual, and providing access to an entity profile related to the requestor. Each of these processes are discussed in turn.

First, the entity resolution system 100 receives Personal Identification Information (PII) datasets from various historical data sources 112. The PII datasets are received in a labeled format, such that the data is associated with a label for the information. For example, data may be labeled as any of the following: name, which may include data related to a first name, nickname, last name, middle name, prefix, or suffix; date of birth; gender; address, which may include data related to street name, city, state, Zip5, Zip4, and type; phone, which may include data related to cell phone, home phone, and work phone; email, which may include data related to personal email, canonical email, and work email; Internet Protocol (IP) address of the computer providing the data; a device identification; and any other identifiers of the PII within the dataset. Each of these labeled datasets may be considered fields, which provide the data and label for the data (e.g., Name, John [firstname] Doe [lastname]). A collection of fields may be considered an attribute (e.g., Name ([Fields])). A collection or map of attributes may be considered a record, and a collection of records may be considered a cluster, which generally represents an entity or individual. The entity resolution system 100 makes use of each level of dataset, whether it be the field, attribute, record, or cluster.

Once the entity resolution system 100 receives the datasets from the historical data sources 112, the entity resolution system 100 creates a unique record identification (RID) for each record received. For example, if the entity resolution system 100 receives a dataset from a cruise line reservation, the entity resolution system 100 creates a unique RID for the cruise line reservation that includes the fields and attributes associated with the cruise line reservation. To illustrate, if the entity provides their name, date of birth, and email for the cruise line reservation, then the unique RID includes the input data associated with those fields. Once the unique RID for each record is created, the entity resolution system 100 cleans and standardizes the existing fields. For example, each unique RID may include information for some fields but not others. Using the cruise line reservation example, the entity may have provided their name, date of birth, and email, but not have provided a gender or phone number in making the cruise line reservation. The entity resolution system 100 can clean and standardize these fields (received or not) such that the unique RID is a single, standardized format and includes a consistent number of fields.

Once the unique RID is created for each of the records received from the one or more historical data source(s) 112, the entity resolution system 100 inputs the unique RIDs into the multi-pass blocking process 114 to partition the unique RIDs into the disjointed groups of records 116.

Figure 2:
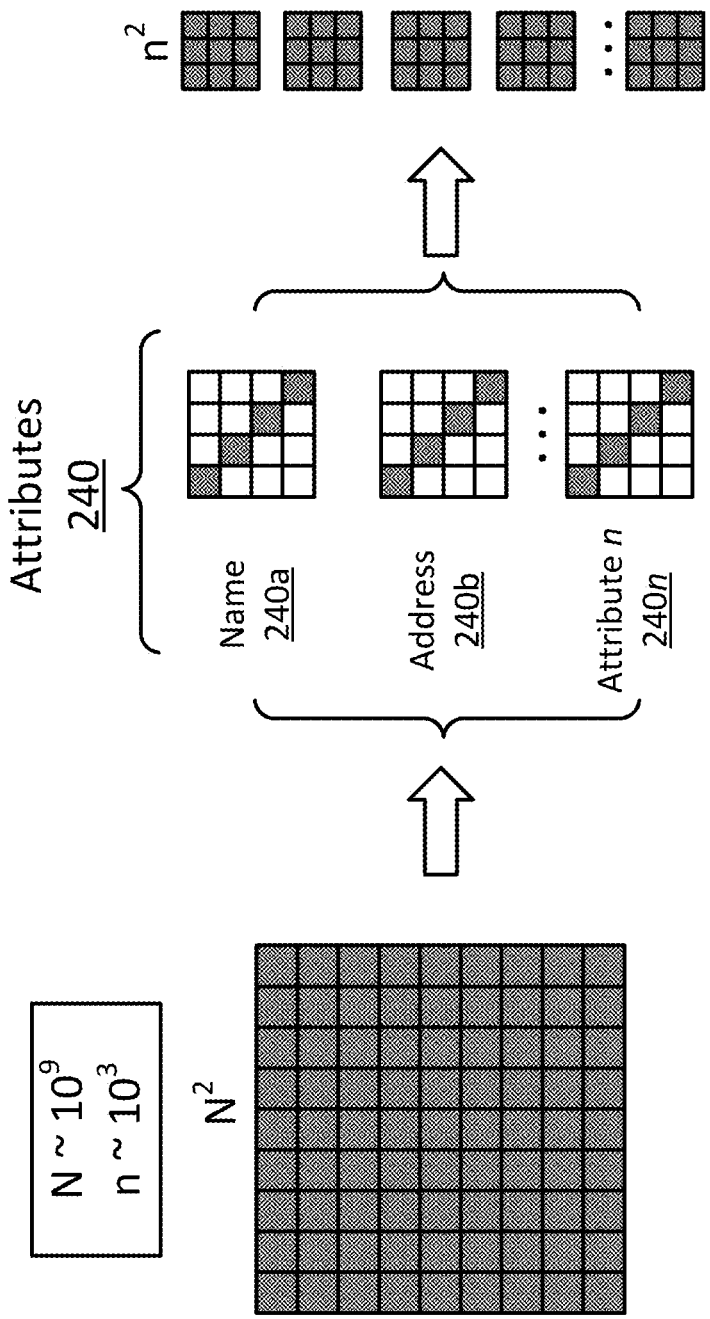
FIG. 2 illustrates a multi-pass blocking algorithm for use in an entity resolution system, in accordance with some examples.

FIG. 2 illustrates an exemplary multi-pass blocking algorithm 200. In some examples, the multi-pass blocking algorithm 200 is used during the multi-pass blocking process 114 illustrated in FIG. 1. In particular, the multi-pass blocking algorithm 200 is based on forming a first single N×N matrix 210 including all the unique RIDs captured by the entity resolution system 100 (e.g., Matrix N~$10^9$), and normalizing the fields within the unique RIDs. In this way, the single N×N matrix 210 may be considered an entity matrix, as it contains a matrix of the unique RIDs associated with PII datasets received from the historical data sources 112. However, any matrix that includes entity information may be considered an entity matrix, and entity matrix is not intended to be limited to the single N×N matrix 210 illustrated in FIG. 2. While the single N×N matrix 210 provides all the unique RIDs for the records received from the historical data source(s), the size of this dataset makes processing the single N×N matrix 210 very challenging and inefficient. Thus, the multi-pass blocking algorithm diagonalizes the single N×N matrix 210 into diagonal matrices 220 based on selecting blocking keys associated with the attributes 240. For example, the multi-pass blocking algorithm 200 may select blocking keys based on name 240a, phone 240b, or any other attribute 240n or combination of attributes 240. For each selected blocking key, the multi-pass blocking algorithm 200 drops records with frivolous values for the blocking key, create a lean version of the data with only the necessary fields associated with the blocking keys, partition the data by sorting or hashing, and assign initial block identifiers (BID) to records with each of the unique blocking key values. The multi-pass blocking algorithm 200 then outputs pairs of BIDs and RIDs or blocks of RIDs. Once this output is received, each of the blocks or pairs are merged to create the disjointed groups 230, and then assigned a group identifier (GID) which is merged with the initial records. Once this process is completed, the multi-pass blocking algorithm 200 will have processed the PII datasets from the historical data source(s) 112 into the disjointed group of records 116.

Referring back to FIG. 1, once the disjointed groups of records 116 are formed, the entity resolution system 100 inputs the disjointed groups of records 116 into the distributed clustering process 118 and edge pruning process 119 to generate the entity graph 120. For example, the distributed clustering process 118 and/or the edge pruning process 119 may be achieved with a machine-learning algorithmic model. The distributed clustering process 118 may be performed by hard clustering or fuzzy clustering. However, in the preferred embodiment, fuzzy clustering is employed in order to account for the potential field value variations and legit changes over time in similar records caused by the input from different historical data source(s) 112.

In one example, the distributed clustering process 118 of the entity resolution system 100 first creates auxiliary entity classes for the disjointed group of records 116, namely, a Record storing a transaction record and the associated attribute classes, a Node storing a collection of Records, an Edge providing an edge (src, dst) between two nodes, and an IDGraph. Once the auxiliary entity classes are created, the distributed clustering process 118 receives the disjointed groups of records 116 and partitions the data based on the GID of the disjointed groups of records 116. Then, for each individual disjointed group, the distributed clustering process 118 creates a Record/Node with the attributes and performs an agglomerative clustering within each group. Specifically, the distributed clustering process 118 creates Edge (src, dst) pairs, and filters the edges with certain conditions, for example by applying blocking conditions. These blocking conditions may be related to the attributes, and as such, as seeking to pair like attributes within the Edge pairs.

The distributed clustering process 118, using a machine-learning similarity model, calculates, estimates, and/or predicts similarity metrics 117 and/or distance metrics 128 of each of the Edges. For example, the distributed clustering process 118 can create similarity metrics 117 based on similar features at the individual attribute level, and can create fuzzy match scores based on whether the datasets match (e.g., have high similarity, for instance greater than a similarity threshold) between the Edges. The distributed clustering process 118 can create the similarity metrics 117 at the field level, the attribute level, the record level, and/or the Node level. In some examples, the distributed clustering process 118 can create distance metrics 128 based on feature differences and/or similarities at the individual attribute level, and can create fuzzy match scores based on whether the datasets match (e.g., have low distance, for instance less than a distance threshold) between the Edges. The distributed clustering process 118 can create the distance metrics 128 at the field level, the attribute level, the record level, and/or the Node level.

After the distributed clustering process 118, the disjointed group of records 116 moves to the edge pruning process 119 to split the resulting clusters and reduce false positives. In particular, the edge pruning process 119 employs a predefined configurable distance threshold for determining whether the distance metric 128 indicates whether the edge pruning process 119 should drop or keep the Edge pair. In some examples, the distance metric 128 can be referred to as a difference metric, and the distance threshold can be referred to as a difference threshold. The distance metrics 128 are generated in a similar manner to the similarity metrics 117 but are based on differences in the features at the individual attribute level. The edge pruning process 119 compares each of the distance metrics 128 to the predefined configurable distance threshold, and if the distance metric 128 meets or exceeds (e.g., is greater than or equal to) the distance threshold, then the Edge pair is dropped, deleted, terminated, and/or removed as not being a match. However, if the distance metric 128 does not meet or exceed the distance threshold (e.g., is less than the distance threshold), then the Edge pair is kept as being a match.

In some examples, the edge pruning process 119 employs a predefined configurable similarity threshold for determining whether the similarity metric 117 indicates whether the edge pruning process 119 should drop or keep the Edge pair. The edge pruning process 119 compares each of the similarity metrics 117 to the predefined configurable similarity threshold, and if the similarity metric 117 meets or exceeds (e.g., is greater than or equal to) the similarity threshold, then the Edge pair is kept. However, if the similarity metric 117 does not meet or exceed the similarity threshold (e.g., is less than the similarity threshold), then the Edge pair is dropped, deleted, terminated, and/or removed as not being a match. In some examples, the edge pruning process 119 compares the distance metric 128 to the distance threshold, compares the 117// to the similarity threshold, or a combination thereof.

Once the edge pruning process 119 determines that there is an edge between two respective Nodes based on the aforementioned comparison, then the edge pruning process 119 merges the Nodes into a single cluster. The edge pruning process 119 then collects and merges all the Nodes into their respective clusters, thereby clustering Records with similar or the same entity data. The edge pruning process 119 then finalizes the clusters by assigning a unique pin or identifier for each node, and ultimately joins the disjointed groups of records 116 with the cluster assignment, providing an output, for instance including an identifier (e.g., pin, GID, RID, another identifier discussed herein, or a combination thereof).

The outputs from the distributed clustering process 118 and edge pruning process 119 are used to generate both the entity graph 120, as well as update the similarity metrics 117 and distance metrics 128 such that the similarity metrics 117 and distance metrics 128 are collected and stored at the attribute level, the record level, and the cluster level. Further, the distance metrics 128 are used during the online 140 portion of the entity resolution system 100 during the resolve entities process 148 discussed further below.

Figure 3:
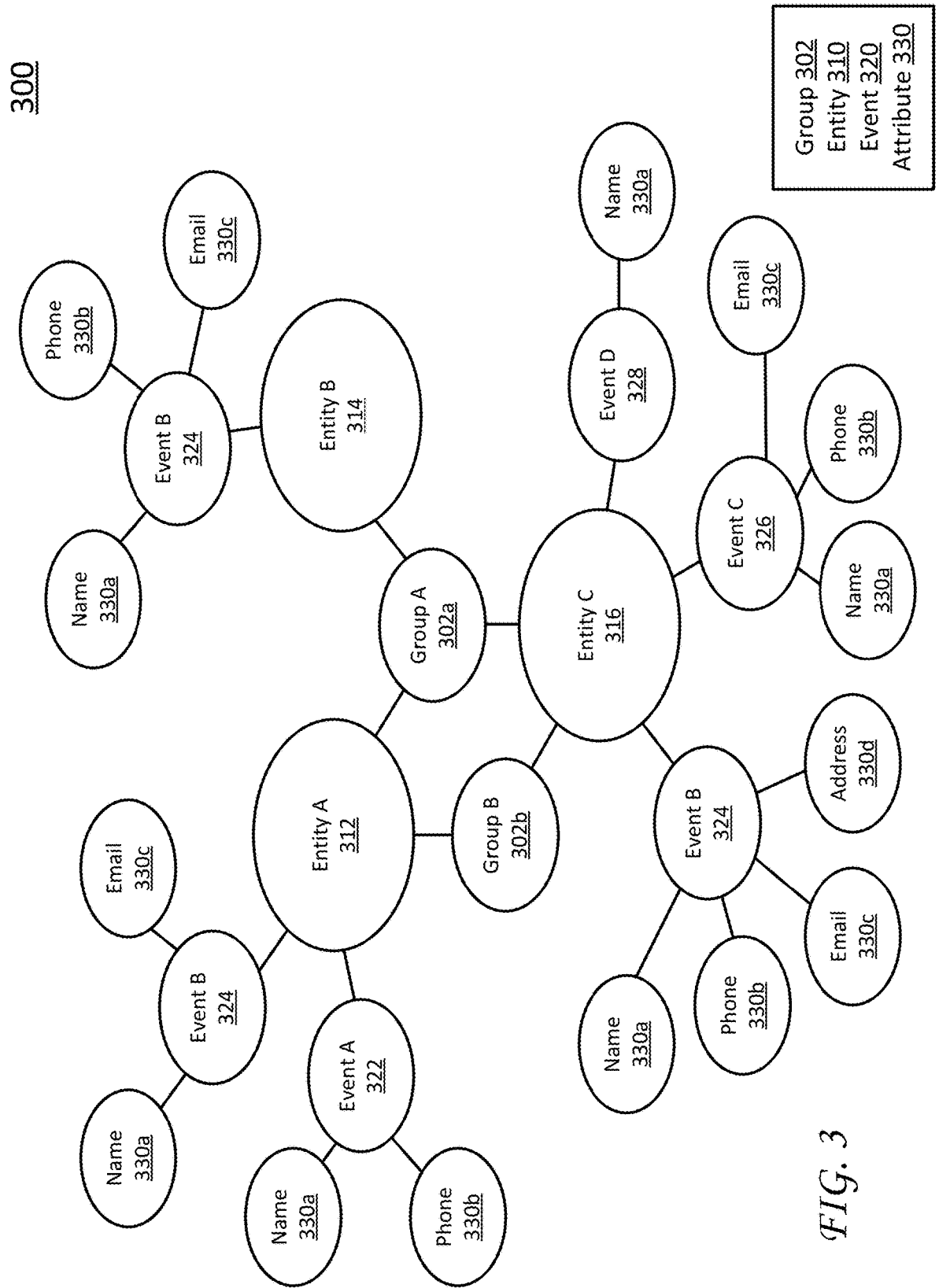
FIG. 3 illustrates an entity graph for use in an entity resolution system, in accordance with some examples.

Once the clusters are finalized and joined with the disjointed groups of records 116, the entity resolution system 100 uses the clusters and connections determined therein to create and store the entity graph 120. FIG. 3 illustrates an exemplary entity graph 300. The exemplary entity graph 300 provides a general example of the entity graph 120 used in the entity resolution system 100 illustrated in FIG. 1. The exemplary entity graph 300 is for clarity and is not intended to be limited by the size, shape or format.

The exemplary entity graph 300 provides a single unified view of entities and prospects based on their interactions with other entities. The exemplary entity graph 300 provides an interconnected event-level graph composed of the Nodes and Edges. In this exemplary entity graph 300, each Node represents a real-world event, such as an entity making an online or in-store transaction. Each Edge represents a connection between two Nodes, such as the two events sharing an attribute. The exemplary entity graph 300 also includes super nodes and super edges, where the super nodes represent an entity (e.g., an individual or an entity), and super edges representing the connections between two super nodes. In this exemplary entity graph 300, the node contains specific information about an entity (e.g., an attribute), while the super node contains all the historical information linked to that entity. This type of entity graph 300 provides entities a holistic view of the entity journey, thereby providing comprehensive entity insights.

As shown in FIG. 3, the exemplary entity graph 300 includes the following nodes: group(s) 302, event(s) 320, and attribute(s) 330; and the following super nodes: entity(ies) 310. As shown in FIG. 3, the super nodes include Entity A 312, Entity B 314, and Entity C 316. Each of these entities 310 provide all the historical information linked to that specific entity. Each respective entity 310 is connected by an edge to the group(s) 302, the event(s) 320, and the attributes 330. An entity reviewing the exemplary entity graph 300 would understand that Entity A attended event A 322 (e.g., a restaurant reservation) and event B 324 (e.g., a cruise line reservation), and each of these events 320 are associated with attributes 330 such as name 330$a$, phone 330$b$, and email 330$c$. The same or different attributes 330 may be connected to each event 320 and is generally based on the PII datasets received from the historical data sources 112. As further shown in FIG. 3, Entity B 314 also attended event B 324, and provided additional attributes 330 related to the event B 324, including name 330$a$, phone 330$b$, and email 330$c$. Entity C 316 also attended event B 324, but also attended event C 326 and event D 328. Each of these event B 324, event C 326, and event D 328 include their own attributes, including name 330$a$, phone 330$b$, email 330$c$, and address 330$d$. Moreover, the entity graph is also able to determine the groups 302 to which the entities 310 belong. For example, the exemplary entity graph 300 demonstrates that Entity A 312, Entity B 314, and Entity C 316 all attended the event B 324, and thus may be grouped into group A 302$a$ (e.g., travel group). Additionally, if it is determined that the last name field of the name 330$a$ attribute for Entity A and Entity C match but the last name field of the name 330$a$ attribute for Entity B is different, then Entity A 312 and Entity C 316 may be grouped into a separate group B 302$b$ (e.g., family group). Thus, the exemplary entity graph 300 provides a clear holistic view of the interactions between each of the super nodes and the nodes to which they are connected via edges.

Referring back to FIG. 1, once the entity graph 120 is generated, then the entity resolution system 100 performs the entity index creation process 122 to create the entity indices 130 for the individuals or entities. For example, each of the unique entities are associated with a personal identification number (PIN), which may be the basis for the entity indices 130 for each individual entity. In other examples, each of the unique entities are associated with an entity profile, which may also be the basis for the entity indices 130. In some other examples, the entity indices 130 may include the PIN and entity profile. The entity indices 130 represent the unique entity that was determined by the entity resolution system 100. Once the entity indices 130 for the one or more individuals or entities are created, then the batch 110 portion of the entity resolution system 100 is complete.

Figure 4:
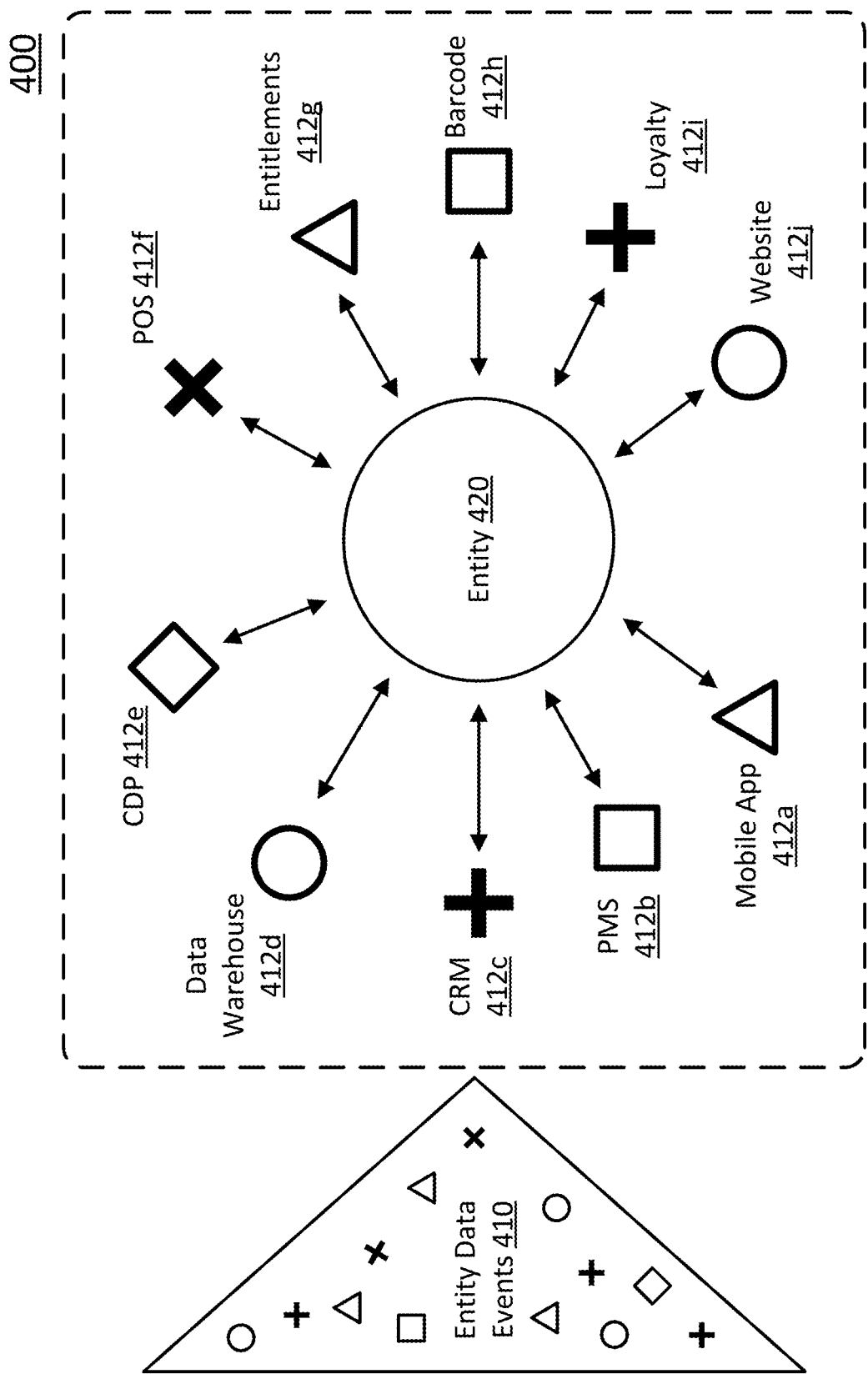
FIG. 4 illustrates an exemplary resolved entity index for use in an entity resolution system, in accordance with some examples.

FIG. 4 illustrates an exemplary resolved entity index 400. The exemplary resolved entity index 400 provides a general example of the entity indices 130 used in the entity resolution system 100 illustrated in FIG. 1. The exemplary resolved entity index 400 is for clarity and is not intended to be limited by the size, shape or format.

The exemplary resolved entity index 400 provides an exemplary view of a resolved entity and the datasets associated therewith. The exemplary resolved entity index 400 provides an example of a resolved entity index 400 for entity 420, as well as the datapoints 412 associated with entity 420. In this exemplary resolved entity index 400, each datapoint 412 represents a real-world attribute having the field data associated with the attribute. Each datapoint 412 is received from the entity data events 410, which may include PII of the entity 420 sourced from the historical data sources 112 referenced in FIG. 1. This type of resolved entity index 400 also provides one example of an entity profile associated with the resolved entity index 400, thereby providing comprehensive entity insights for use in entity resolution during the online 140 portion of the entity resolution system 100. To illustrate, the resolved entity index 400 for the entity 420 may be the source of the information searched during the search indices and pull entities process 146 and resolve entities process 148 described further below.

As shown in FIG. 4, the exemplary resolved entity index 400 includes entity 420 and the plurality of datapoints 412 surrounding the resolved entity index 400 of entity 420. As described above, datapoints 412 are extracted from entity data events 410 and analyzed through the batch 110 portion of the entity resolution system 100 of FIG. 1. In this example, the datapoints 412 include datapoints associated with a mobile application 412*a*, Product Marketing and Service (PMS) system 412*b*, CRM system 412*c*, Data Warehouse system 412*d*, CDP system 412*e*, Point-of-Sale (POS) system 412*f*, entitlements 412*g*, barcode 412*h*, loyalty system 412*i*, and website 412*j*. While this list provides some examples of datapoints 412, many others may also be included in the resolved entity index 400, and the datapoints 412 associated with the resolved entity index 400 are not intended to be limited to the aforementioned list.

Each datapoint 412 includes the underlying fields containing the relevant PII for entity 420. For example, the loyalty system 412*i* may include the name and email address of entity 420, while the Data Warehouse system 412*d* may include the name, home address, and phone number of entity 420. As such, the resolved entity index 400 for entity 420 includes all relevant datapoints 412 and the underlying PII associated with entity 420 across many different systems. This permits the searching and resolving entities during the online 140 portion of the entity resolution system 100 to be accomplished accurately and efficiently.

Referring back to FIG. 1, in some embodiments, once the batch 110 portion is complete, the online 140 portion may begin. In the online 140 portion, the entity resolution system 100 receives an entity query and/or an identity query for an online transaction 142 or an online entity search 144. The request for the online transaction 142 or the online entity search 144 includes PII datasets associated with the individual or entity making the request (e.g., the requestor). The entity resolution system 100 then applies an entity resolution machine-learning algorithm to resolve the entity of the requestor. The entity resolution machine-learning algorithm may include the search indices & pull entities process 146 and resolve entities process 148, or each of these processes may include the entity resolution machine-learning algorithm.

In one embodiment, the entity resolution system 100 inputs PII datasets of the online transaction 142 request and/or the online entity search 144 request into the entity resolution machine-learning algorithm and calculates a set of pre-defined linking keys for the index dimensions of the PII datasets for the requestor. Then, during the search indices and pull entities process 146, the entity resolution machine-learning algorithm searches the linking keys against the entity indices 130 to pull the linked entities from the database storing the entity indices 130. Once the entities have been pulled, then the entity resolution machine-learning algorithm resolves the entity using the resolve entities process 148.

During the resolve entities process 148, the entity resolution machine-learning algorithm filters out less-relevant entities using a rule-based fuzzy matching. Once the less-relevant entities are filtered out, the entity resolution machine-learning algorithm applies probabilistic fuzzy matching using the distance metrics 128 to resolve to a unique entity index (e.g., an identity PIN and/or an entity profile). In particular, the entity resolution machine-learning algorithm calculates similarity scores or metrics (e.g., similarity metrics 117) and/or distance scores or metrics (e.g., distance metrics 128) between each unique entity record (e.g., each unique entity indices 130) and the entity query (e.g., the online transaction 142 request and/or the online entity search 144 request) at the field level, the attribute level, the record level, and the index level. The online transaction 142 request and/or the online entity search 144 request applies rule-based filtering to obtain the relevant entity indices 130 that are matches and exclude the irrelevant entity indices 130. The rule-based filtering and/or rule-based fuzzy matching may be associated with one or more thresholds, such as similarity threshold(s) and/or distance threshold(s). For instance, the search indices & pull entities process 146, the resolve entities process 148, the online transaction 142 request, and/or the online entity search 144 request can compare the similarity scores or metrics (e.g., similarity metrics 117) to a similarity threshold (e.g., keeping entity indices 130 with similarity metrics exceeding the similarity threshold and/or removing entity indices 130 with similarity metrics below the similarity threshold), can compare the distance scores or metrics (e.g., distance metrics 128) to a distance threshold (e.g., keeping entity indices 130 with distance metrics below the distance threshold and/or removing entity indices 130 with similarity metrics exceeding the distance threshold), or a combination thereof. In some examples, the rule-based filtering and/or rule-based fuzzy matching compares the distance metric 128 to the distance threshold, compares the 117// to the similarity threshold, or a combination thereof.

Next, the entity resolution machine-learning algorithm calculates the confidence that the resolved entity is accurate and may further create attribute flags. In particular, the entity resolution machine-learning algorithm applies probabilistic matching for each unique entity index in the relevant entity indices 130, and selects the top unique entity index with the highest confidence score. The entity resolution machine-learning algorithm may also adjust the confidence scores of the relevant entity indices by calculating the relevant number of entity indices, calculating the gap between the top scoring and second scoring confidences, and then adjust the remaining confidence scores accordingly. Alternatively, the confidence may be compared to a predetermined threshold to determine whether the resolved entity index is accurate.

Ultimately, the entity resolution machine-learning algorithm has four potential outcomes. First, the entity resolution machine-learning algorithm may resolve to a single unique entity index, in which case the entity resolution is accurate and the entity resolution system proceeds to the hydration process 150. Second, the entity resolution machine-learning algorithm may link to some relevant entity indices but is not confident enough to resolve to a single unique entity index. Third, the entity resolution machine-learning algorithm may not link to any entity indices 130, in which case the entity resolution system 100 creates a new entity index for the requestor's PII dataset using the batch 110 portion of the entity resolution system 100, so long as the minimum requirements for inputting into the entity resolution system 100 are met. In some examples, the minimum requirements are a name and at least one of the following attributes: date of birth, phone number, address, email, or IP address. Fourth, if the entity resolution machine-learning algorithm does not link to any entity indices 130 and the requestor's PII dataset does not meet the minimum requirements for inputting into the entity resolution system 100, then no new entity index is created and the entity is not resolved.

Furthermore, if the entity resolution machine-learning algorithm determines the resolved entity is accurate, and the entity resolution system 100 proceeds to the hydration process 150. During the hydration process 150, the entity resolution system 100 retrieves the entity index (e.g., entity profile and/or PIN) for the resolved entity and provides it to the requestor based on the type of request. For example, if the request is for the online transaction 142, the hydration process 150 pulls the entity index for the requestor and resolves the entity query and/or identity query of the requestor as matching the entity associated with the entity index. Additionally, in this example, the entity resolution system 100 also captures the additional PII dataset associated with the requestor and updates the entity index associated therewith. In another example, if the request is for the online entity search 144, the hydration process 150 pulls the entity index for the requestor, resolves the entity query and/or identity query of the requestor as matching the entity associated with the entity index, and provides the requestor access to the entity profile associated with the entity index. As such, the entity resolution system 100 efficiently and accurately connecting and matching entities across different datasets and sources.

For illustration purposes, the entity resolution system 100 may resolve various types of entities in practice. For example, in an e-commerce example, an e-commerce business may wish to understand supply and demand in different regions of the country over time. As such, there is a competitive advantage when the same products can be linked across different regions or organizations so that they can analyze and optimize their regional and company-wise inventories. The entity resolution system 100 provides this capability to e-commerce businesses by resolving products across the different regions or organizations. In particular, the historical data sources 112 in this example may be focused on a specific product and its PII (product name, barcode, description, etc.). Then the entity resolution system 100 may analyze this data to ultimately create the entity graph 120 and a specific entity index 130 (e.g., resolved entity index 400) for that specific product. Thus, should the e-commerce business request a product search (e.g., an online entity search), the entity resolution system 100 can pull up the resolved entity index 400 for the e-commerce business, thereby providing the e-commerce business with the regional information sought for that specific product.

In some examples, online recommendation companies can desire to link the same product across different e-commerce businesses along with their product prices over time so they can provide the best recommendation for their customers. Here, the entity resolution system 100 may ingest data from the various e-commerce businesses (e.g., the historical data sources 112) associated with that specific product, and ultimately create the entity graph 120 and specific entity index 130 (e.g., resolved entity index 400) for that specific product. Thus, the entity resolution system 100 can pull up the specific data such that the online recommendation company can understand the product's price over time.

In some examples, some marketing companies may desire to understand when individuals are members of the same household. By understanding the composition of a household, such as whether the household is a couple, includes children, is retired, etc., the company can then create tailored and targeted marketing materials for the individuals in the household. Using the entity resolution system 100, the marketing companies can map the relations between different entities, for example, through entity graph 120, and determine the groups or relationships between the entities. As such, the entity resolution system 100 may have many real-world uses for resolving entities accurately and efficiently across various data sources, systems, and platforms.

It should be noted that the machine-learning algorithms that form the bases of the processes discussed above (e.g., multi-pass blocking process 114, distributed clustering process 118, edge pruning process 119, entity index creation process 122, entity resolution machine-learning algorithm, search indices and pull entities process 146, and/or resolve entities process 148) may be updated and continue learning and improving by receiving new PII datasets from other historical data sources 112, or other requests for online transactions 142 or online entity searches 144. In these embodiments, as additional PII datasets are ingested into the entity resolution system 100, the entity graph 120 and entity indices 130 are also updated with the newly added datasets and attributes. Moreover, the machine-learning algorithms are capable of maintaining a database of similarity metrics 117 and distance metrics 128, similarity and distance scores, confidence scores, and any other outputs from the machine-learning algorithms, and these outputs can be used to update and improve the machine-learning algorithms.

Figure 5:
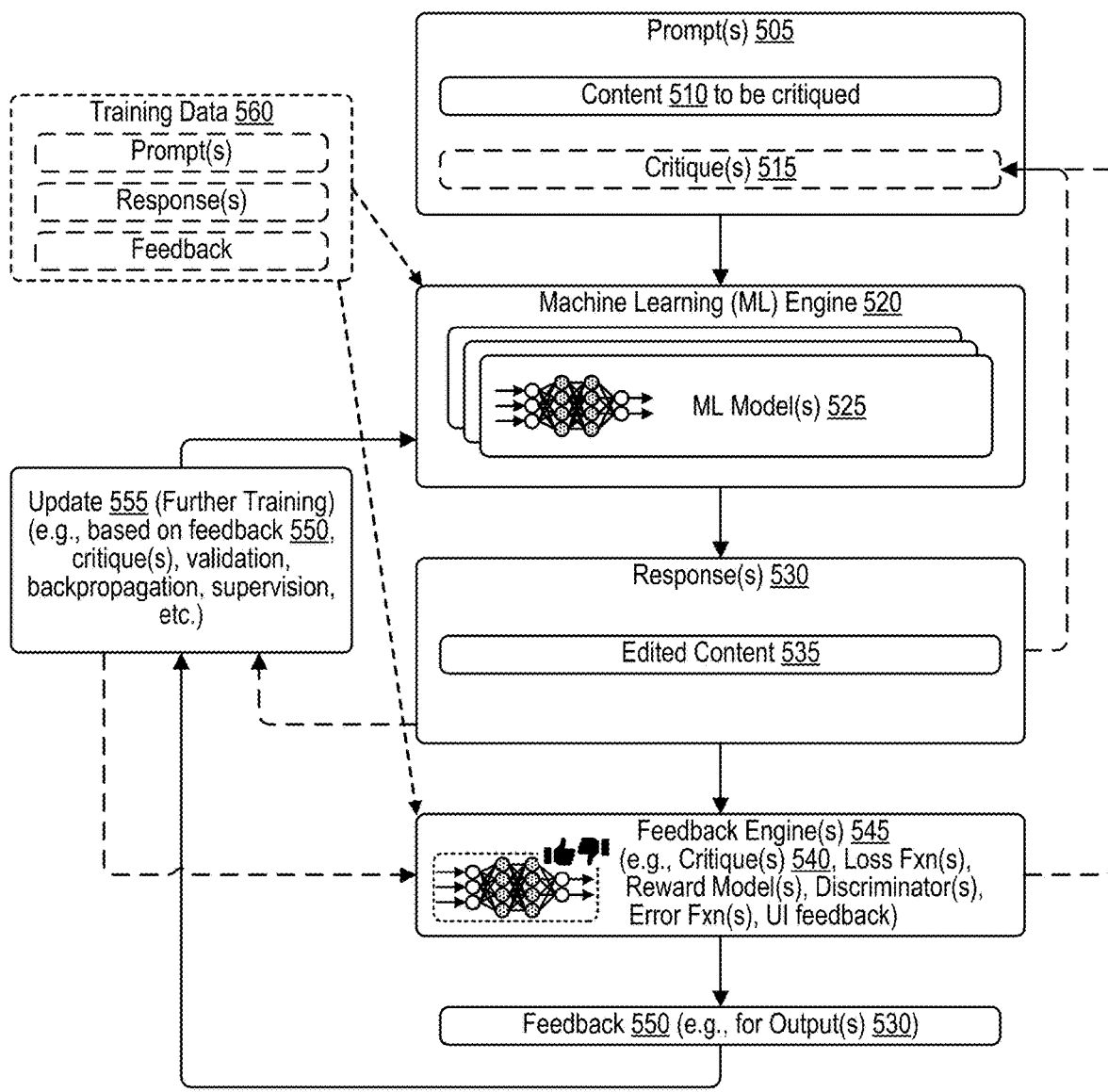
FIG. 5 illustrates a block diagram illustrating training of, use of, and/or updating of one or more machine-learning models in the context of an entity resolution system, in accordance with some examples.

FIG. 5 is a block diagram illustrating training of, use of, and/or updating of one or more machine learning (ML) models 525 in the context of a content processing technique 500 for use with the entity resolution system 100. The content processing technique 500 includes a ML engine 520 for training, using, and/or updating one or more ML models 525. The ML model(s) 525 can include, for example, at least one of the multi-pass blocking process 114, distributed clustering process 118, edge pruning process 119, entity index creation process 122, entity resolution machine-learning algorithm, search indices and pull entities process 146, and/or resolve entities process 148, or a combination thereof.

A prompt 505 can be passed to the ML model(s) 525 of the ML engine 520, and input into the ML model(s) 525. In some examples, the prompt 505 includes or identifies content 510 to be critiqued, and the ML model(s) 525 (e.g., functioning as the multi-pass blocking process 114, distributed clustering process 118, and/or entity resolution machine-learning algorithm) output, in a response 530, critique(s) 540 of the content 510 in the prompt 505. In some examples, the prompt 505 includes or identifies critique(s) 515 (e.g., the critique(s) 540 generated in a previous round) of the content 510 to be edited, and the ML model(s) 525 edits the content 510 from the prompt 505 based on the critique(s) 515 form the prompt 505 to generate and output, in a response 530, edited content 535 that has been edited based on the critique(s) 515 in the prompt 505. For example, critique(s) 415 of the similarity metrics 117 input into the distributed clustering process 118 may indicate that the similarity metrics 117 need to be edited, thereby forming edited content 535, which improves the similarity metrics 117 for use in subsequent distributed clustering process 118. In some examples, the prompt 505 may include a query or another type of input. In some examples, the prompt 505 may be referred to as the input to the ML model(s) 525. In some examples, the response(s) 530 may be referred to as output(s) of the ML model(s) 525.

In some examples, the content processing technique 500 includes feedback engine(s) 545 that can analyze the response 530 (e.g., the edited content 535 and/or the critique(s) 540) to determine feedback 550, for instance as discussed with respect to the confidence scores in the resolve entities process 148 and/or the entity resolution machine-learning algorithm, the pairing of the Nodes during the distributed clustering process 118, or the removal of irrelevant Nodes during the edge pruning process 119. In some examples, the feedback 550 indicates how well the response(s) 530 align to corresponding expected response(s) and/or output(s), how well the response(s) 530 serve their intended purpose, or a combination thereof. In some examples, the feedback engine(s) 545 include loss function(s), reward model(s) (e.g., other ML model(s) that are used to score the response(s) 530), discriminator(s), error function(s) (e.g., in back-propagation), user interface feedback received via a user interface from a user, or a combination thereof. In some examples, the feedback 550 can include one or more alignment score(s) that score a level of alignment between the response(s) 530 and the expected output(s) and/or intended purpose.

The ML engine 520 can use the feedback 550 to generate an update 555 to update (further train and/or fine-tune) the ML model(s) 525. The ML engine 520 can use the update 555 to update (further train and/or fine-tune) the ML model(s) 525 based on the feedback 550, based on feedback in further prompts or responses from a user (e.g., received via a user interface such as a chat interface), critique(s) (e.g., critique(s) 515, critique(s) 540), validation (e.g., based on how well the edited content 535 and/or the critique(s) 540 match up with predetermined edited content and/or critiques), other feedback, or combinations thereof.

The ML model(s) 525 may have been initially trained by the ML engine 520 using training data 560 during an initial training phase, before receiving the prompt 505. The training data 560, in some examples, includes examples of prompt(s) (e.g., as in prompt 505), examples of response(s) (e.g., response 530) to the example prompt(s), and/or examples of alignment scores for the example response(s). In some examples, the ML engine 520 can use the training data 560 to perform fine-tuning and/or updating of the ML model(s) 525 (e.g., as discussed with respect to the update 555 or otherwise). In some examples, for instance, the ML engine 520 can start with ML model(s) 525 that are pre-trained with some initial training and can use the training data 560 to update and/or fine-tune the ML model(s) 525.

In some examples, if feedback 550 (and/or other feedback) is positive (e.g., expresses, indicates, and/or suggests approval, accuracy, and/or quality), then the ML engine 520 performs the update 555 (further training and/or fine-tuning) of the ML model(s) 525 by updating the ML model(s) 525 to reinforce weights and/or connections within the ML model(s) 525 that contributed to the response(s) 530 that received the positive feedback 550 or feedback, encouraging the ML model(s) 525 to continue generating similar responses to similar prompts moving forward. In some examples, if feedback 550 (and/or other feedback) is negative (e.g., expresses, indicates, and/or suggests disapproval, inaccuracy, errors, mistakes, omissions, bugs, crashes, and/or lack of quality), then the ML engine 520 performs the update 555 (further training and/or fine-tuning) of the ML model(s) 525 by updating the ML model(s) 525 to weaken, remove, and/or replace weights and/or connections within the ML model(s) 525 that contributed to the response(s) 530 that received the negative feedback 550 or feedback, discouraging the ML model(s) 525 from generating similar responses to similar prompts moving forward.

Figure 6:
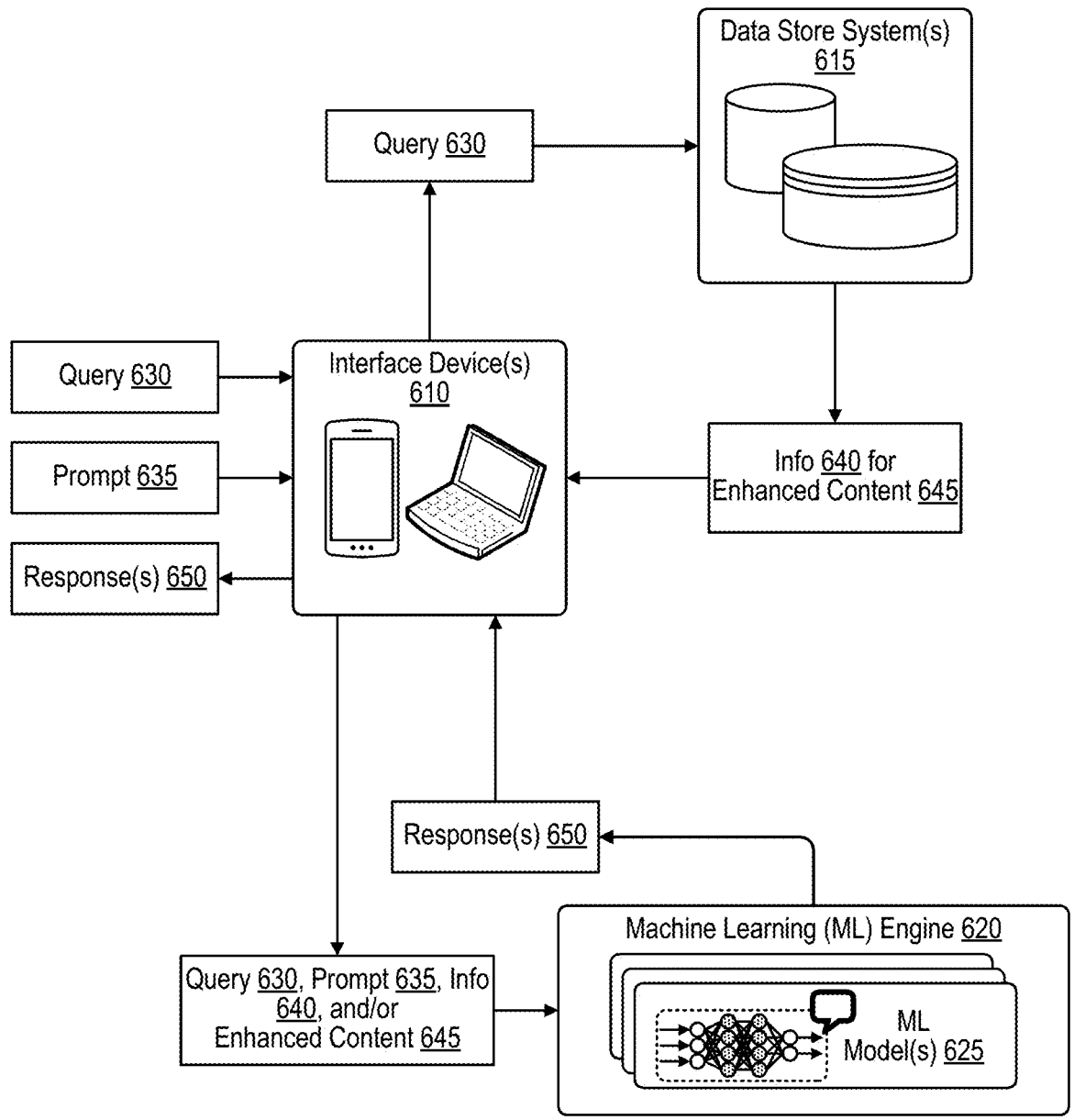
FIG. 6 illustrates a block diagram illustrating a retrieval augmented generation (RAG) system that may be used to implement some aspects of the technology, in accordance with some examples.

FIG. 6 is a block diagram illustrating a retrieval augmented generation (RAG) system 600 that may be used to implement some aspects of the entity resolution system 100 disclosed herein. The RAG system 600 includes one or more interface device(s) 610 that can receive input(s) from a user and/or from another system (e.g., another ML model, the historical data sources 112, and/or online requests from requestors (e.g., entities and/or individuals), for instance by receiving a query 630 and/or a prompt 635 from the user and/or the system. The interface device(s) 610 can send the query 630 to one or more data store system(s) 615 that include, and/or that have access to (e.g., over a network connection), various data store(s) (e.g., database(s), table(s), spreadsheet(s), tree(s), ledger(s), heap(s), and/or other data structure(s)). The data store system(s) 615 searches the data store(s) according to the query 630. In some examples, the interface device(s) 610 and/or the data store system(s) 615 convert the query 630 into tensor format (e.g., vector format and/or matrix format). In some examples, the data store system(s) 615 searches the data store(s) according to the query 630 by matching the query 630 with data in tensor format (e.g., vector format and/or matrix format) stored in the data store(s) that are accessible to the data store system(s) 615. The data store system(s) 615 retrieve, from the data store(s) and based on the query 630, information 640 that is relevant to generating enhanced content 645.

In some examples, the data store system(s) 615 provide the information 640 and/or the enhanced content 645 to the interface device(s) 610. In some examples, the data store system(s) 615 provide the information 640 to the interface device(s) 610, and the interface device(s) 610 generate the enhanced content 645 based on the information 640. The interface device(s) 610 provides the query 630, the prompt 635, the information 640, and/or the enhanced content 645 to one or more ML model(s) 625 (e.g., ML model(s) 525) of an ML engine 620 (e.g., ML engine 520). The ML model(s) 625 generate response(s) 650 (e.g., response(s) 530) that are responsive to the prompt 635. In some examples, the ML model(s) 625 generate the response(s) 650 based on the query 630, the prompt 635, the information 640, and/or the enhanced content 645. In some examples, the ML model(s) 625 generate the response(s) 650 to include the information 640 and/or the enhanced content 645. The ML model(s) 625 provide the response(s) 650 to the interface device(s) 610. In some examples, the interface device(s) 610 output the response(s) 650 to the user (e.g., to the user device of the user) that provided the query 630 and/or the prompt 635. In some examples, the interface device(s) 610 output the response(s) 650 to the system (e.g., the other ML model) that provided the query 630 and/or the prompt 635. In some examples, the data store system(s) 615 may include one or more ML model(s) that are trained to perform the search of the data store(s) based on the query 630.

In some examples, the data store system(s) 615 provides the information 640 and/or the enhanced content 645 directly to the ML model(s) 625, and the interface device(s) 610 provide the query 630 and/or the prompt 635 to the ML model(s) 625.

In an illustrative example, one of the ML model(s) of the distributed clustering process 118 can request that the disjointed groups of records 116 be clustered. The instruction to the distributed clustering process 118 to cluster the disjointed groups of records 116 can be the prompt 635, and the query 630 may provide the blocking conditions to filter the edges based on certain conditions. The data store system(s) 615 can interpret the query 630 and apply, based on the query 630, the various data store(s) that the data store system(s) 615 have access to, blocking conditions to filter the edges based on the certain conditions. The data store system(s) 615 can output this information 640 to the interface device(s) 610, which can generate enhanced content 645. In some examples, the enhanced content 645 adds or appends the information 640 to the prompt 635 and/or the query 630. In some examples, the data store system(s) 615 and/or the interface device(s) 610 generate the enhanced content 645 by modifying the query 630 and/or the prompt 635 before providing the query 630 and/or the prompt 635 to the ML model(s) 625. For instance, the data store system(s) 615 and/or the interface device(s) 610 can generate the enhanced content 645 by modifying the prompt 635 to instruct the distributed clustering process 118 to cluster the filtered edges if they are sufficiently similar based on the similarity metrics 117. In this way, the ML model(s) 625 do not need to seek to find out what the cluster conditions are, because the prompt 635 is already modified to lay out the clustering instead of, or in addition to, applying the blocking conditions to the edges.

Figure 7:
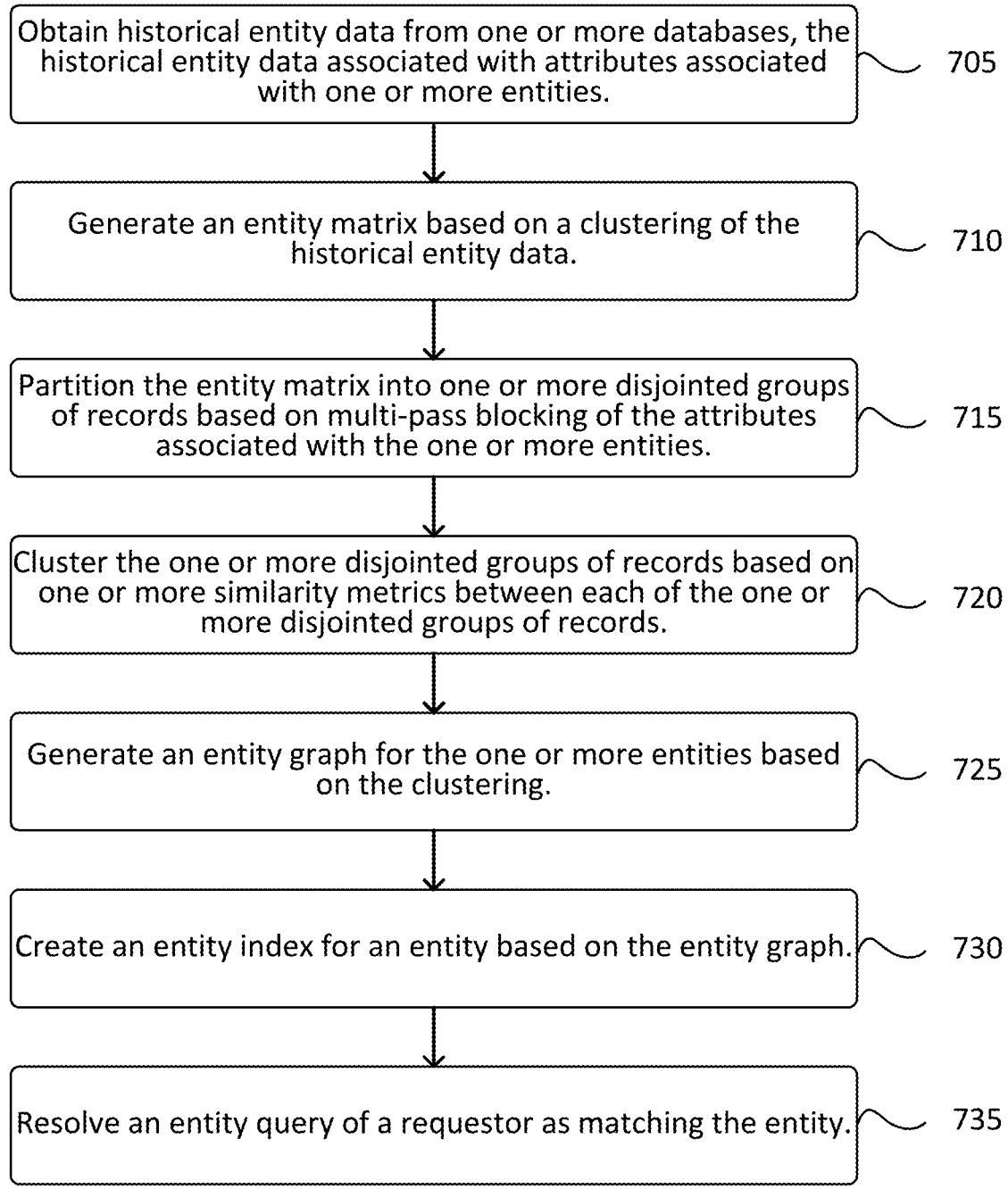
FIG. 7 illustrates a flow diagram illustrating exemplary operations for a process for entity resolution, in accordance with some examples.

FIG. 7 illustrates a flow diagram illustrating exemplary operations for a process for entity resolution. The process 700 may be referred to as a method for entity resolution and/or identity resolution. The process 700 may be performed by an entity resolution system. The entity resolution system can also be referred to as an identity resolution system. In some examples, the entity resolution system can include, for instance, the entity resolution system 100, the multi-pass blocking algorithm 200, the entity graph 300, the resolved entity index 400, the content processing technique 500, the RAG system 600, the computing system 800, a non-transitory computer-readable storage medium storing instructions that perform the process 700 when executed by a processor such as processor 810, other components described herein, substitutes for any of these components, sub-components of any of these components, or an combination thereof.

At operation 705, the entity resolution system obtains historical entity data from one or more databases. The historical entity data may be associated with attributes associated with one or more entities. In some embodiments, the attributes associated with the one or more entities includes at least one of a name, address, date of birth, gender, phone number, email address, a device identification, or attribute(s) discussed herein. Examples of the one or more entities include the entities discussed with respect to the entity resolution system 100, the entities associated with the attributes 240, the Entity A 312, the Entity B 314, the Entity C 316, the Entity 420, entities associated with the prompt 505 and/or the response(s) 530, entities associated with the query 630 and/or the prompt 635 and/or the information 640 and/or the response(s) 650, or a combination thereof. Examples of the historical entity data include data from the historical data source(s) 112, historical entity data processed via the multi-pass blocking algorithm 200, data from the entity data events 410, data from the mobile application 412*a*, data from the PMS system 412*b*, data from the CRM system 412*c*, data from the Data Warehouse system 412*d*, data from the CDP system 412*e*, data from the Point-of-Sale (POS) system 412*f*, data from the entitlements 412*g*, data from the barcode 412*h*, data from the loyalty system 412*i*, data from the website 412*j*, data associated with the prompt 505, data from the data store system(s) 615, other historical entity data discussed herein, or a combination thereof. In some examples, the one or more entities may refer to one or more individuals. In some examples, the historical entity data may include historical identity data associated with attributes associated with the one or more individuals.

At operation 710, the entity resolution system generates an entity matrix based on a clustering of the historical entity data. Examples of the entity matrix include a matrix of unique record identifications (RIDs) captured by the entity resolution system 100, the single N×N matrix 210, other entity matrices discussed herein, or a combination thereof. In some examples, the entity matrix may include an identity matrix based on a clustering of historical identity data.

At operation 715, the entity resolution system partitions the entity matrix into one or more disjointed groups of records based on multi-pass blocking of the attributes associated with the one or more entities. Examples of the multi-pass blocking of the attributes includes the multi-pass blocking process 114, the multi-pass blocking algorithm 200, another multi-pass blocking of attributes discussed herein, or a combination thereof.

At operation 720, the entity resolution system clusters the one or more disjointed groups of records based on one or more similarity metrics between each of the one or more disjointed groups of records. In some examples, the similarity metrics may be referred to as distance metrics, similarity heuristics, and/or distance heuristics.

At operation 725, the entity resolution system generates an entity graph for the one or more entities based on the clustering. Examples of the entity graph include the entity graph 120, the entity graph 300, other entity graph(s) discussed herein, or a combination thereof. In some examples, the entity graph may be, and/or include, an identity graph, for instance where the one or more entities are individuals.

In some embodiments, the generation of the entity graph further includes inputting the one or more disjointed groups of records and one or more similarity metrics into a machine learning model, receiving a clustering output from the machine learning model, and generating the entity graph based on the clustering output. In some examples, the generation of the entity graph further includes receiving current entity data associated with the requestor, inputting the current entity data into the machine learning model, and updating the entity graph based on an output from the machine learning model. In some examples, the generation of the entity graph further includes updating the machine learning model based on the update to the entity graph. Examples of the machine learning model include ML model(s) associated with the distributed clustering process 118, the ML model(s) 525, the ML model(s) 625, other ML model(s) discussed herein, or a combination thereof.

At operation 730, the entity resolution system creates an entity index for an entity based on the entity graph. In some examples, the one or more entities include an individual. In some examples, the entity index is a personal identification number (PIN) (e.g., associated with the individual). Examples of the entity index include the entity indices 130, the resolved entity index 400, other entity indices discussed herein, or a combination thereof.

At operation 735, the entity resolution system resolves an entity query and/or identity query of a requestor as matching the entity. Examples of the entity include the entity(ies) associated with the entity graph 120, entity(ies) associated with the entity indices 130 or resolved entity index 400, entity(ies) associated with the various processes of the entity resolution system 100, entity(ies) associated with the multi-pass blocking algorithm 200, entities 310, Entity A 312, Entity B 314, Entity C 316, entity 420, another entity discussed herein, or a combination thereof. In some embodiments, the resolution of the identity of the requestor further includes receiving an entity verification request for access to an entity profile, the entity verification request including current entity data of the requestor, determining at least one linking key associated with the current entity data of the requestor, matching the at least one linking key with the entity index for the entity, and providing the requestor access to the entity profile.

Figure 8:
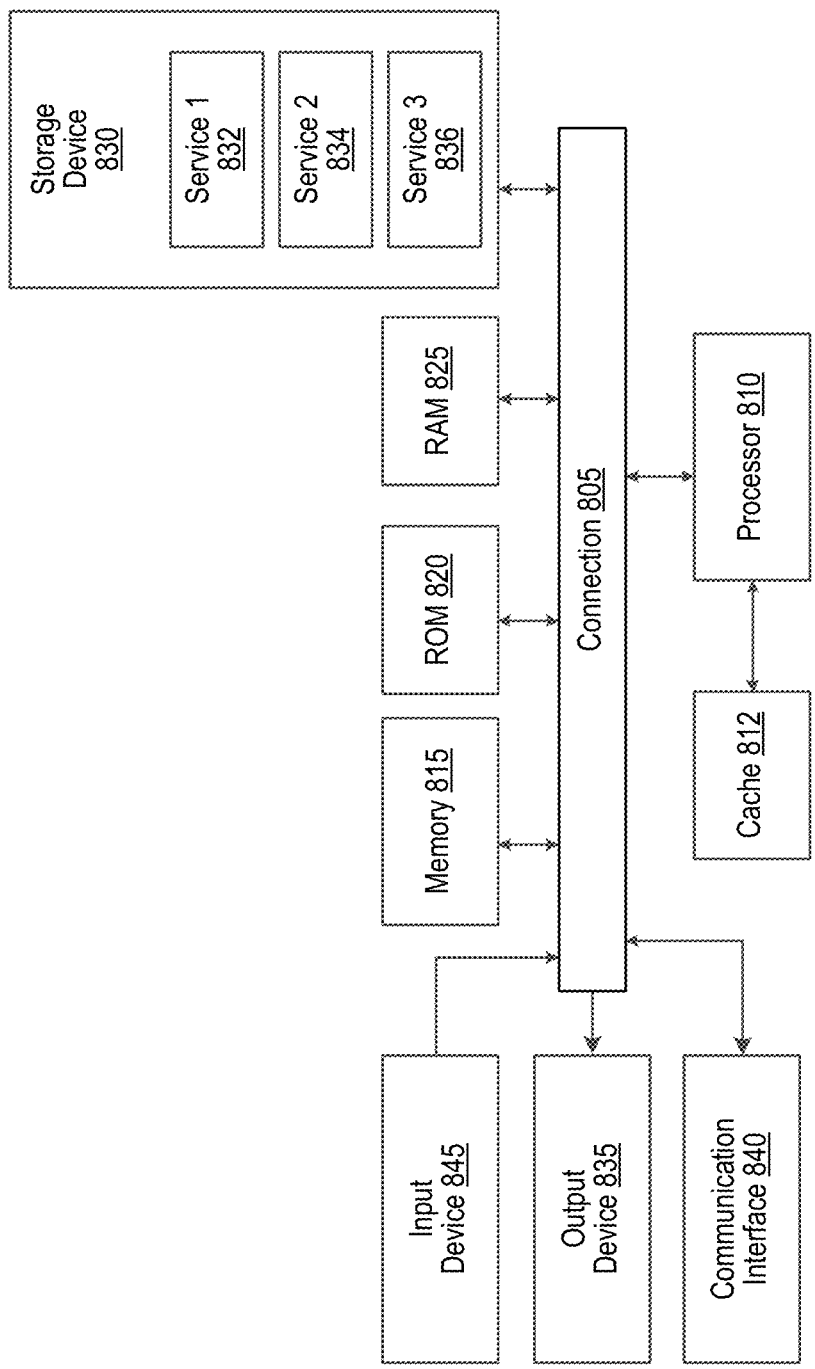
FIG. 8 illustrates a block diagram of an exemplary computing device that may be used for implementing some examples of the present technology.

FIG. 8 shows an exemplary computing system 800, which may be used to implement some aspects of the technology disclosed herein. For example, any of the computing devices, computing systems, network devices, network systems, and/or servers described herein may include at least one computing system 800, or may include at least one component of the computing system 800 identified in FIG. 8. The computing system of FIG. 8 includes a connection 805 which can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

The example computing system 800 includes at least one processing unit (CPU or processor) 810 and connection 805 that couples various system components including system memory 815, such as read-only memory (ROM) 820 and random access memory (RAM) 825 to processor 810. The computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric. The processor 810 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 810 may include one or more cores, either integrated onto a single chip or spread across multiple chips connected or coupled together. Memory 815 stores, in part, instructions and data for execution by processor 810. Memory 815 can store the executable code when in operation.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A method comprising: obtaining historical entity data from one or more databases, the historical entity data associated with attributes associated with one or more entities; generating an entity matrix based on a clustering of the historical entity data; partitioning the entity matrix into one or more disjointed groups of records based on multi-pass blocking of the attributes associated with the one or more entities; clustering the one or more disjointed groups of records based on one or more similarity metrics between each of the one or more disjointed groups of records; generating an entity graph for the one or more entities based on the clustering; creating an entity index for an entity based on the entity graph; and resolving an entity query of a requestor as matching the entity.

Aspect 2. The method of aspect 1, wherein resolving the entity query of the requestor further comprises: receiving an entity verification request for access to an entity profile, wherein the entity verification request includes current entity data of the requestor; determining at least one linking key associated with the current entity data of the requestor; matching the at least one linking key with the entity index for the entity; and providing the requestor access to the entity profile.

Aspect 3. The method of aspect 1, wherein generating the entity graph further comprises: inputting the one or more disjointed groups of records and one or more similarity metrics into a machine learning model; receiving a clustering output from the machine learning model; and generating the entity graph based on the clustering output.

Aspect 4. The method of aspect 3, further comprising: receiving current entity data associated with the requestor; inputting the current entity data into the machine learning model; and updating the entity graph based on an output from the machine learning model.

Aspect 5. The method of aspect 4, further comprising: updating the machine learning model based on the update to the entity graph.

Aspect 6. The method of aspect 1, wherein the one or more entities include an individual, and wherein the entity index is a Personal Identification Number associated with the individual.

Aspect 7. The method of aspect 1, wherein the attributes associated with the one or more entities includes at least one of a name, address, date of birth, gender, phone number, email address, or device identification.

Aspect 8. A computing apparatus comprising: a processor; and a memory storing instructions that, when executed by the processor, cause the processor to: obtain historical entity data from one or more databases, the historical entity data associated with attributes associated with one or more entities; generate an entity matrix based on a clustering of the historical entity data; partition the entity matrix into one or more disjointed groups of records based on multi-pass blocking of the attributes associated with the one or more entity; cluster the one or more disjointed groups of records based on one or more similarity metrics between each of the one or more disjointed groups of records; generate an entity graph for the one or more entities based on the clustering; create an entity index for an entity based on the entity graph; and resolve an entity query of a requestor as matching the entity.

Aspect 9. The computing apparatus of aspect 8, wherein resolving the entity query of the requestor further comprises: receive an entity verification request for access to an entity profile, wherein the entity verification request includes current entity data of the requestor; determine at least one linking key associated with the current entity data of the requestor; match the at least one linking key with the entity index for the entity; and provide the requestor access to the entity profile.

Aspect 10. The computing apparatus of aspect 8, wherein generating the entity graph further comprises: input the one or more disjointed groups of records and one or more similarity metrics into a machine learning model; receive a clustering output from the machine learning model; and generate the entity graph based on the clustering output.

Aspect 11. The computing apparatus of aspect 10, wherein the instructions further cause the processor to: receive current entity data associated with the requestor; input the current entity data into the machine learning model; and update the entity graph based on an output from the machine learning model.

Aspect 12. The computing apparatus of aspect 11, wherein the instructions further cause the processor to: update the machine learning model based on the update to the entity graph.

Aspect 13. The computing apparatus of aspect 8, wherein the one or more entities include an individual, and wherein the entity index is a Personal Identification Number associated with the individual.

Aspect 14. The computing apparatus of aspect 8, wherein the attributes associated with the one or more entity includes at least one of a name, address, date of birth, gender, phone number, email address, or device identification.

Aspect 15. A non-transitory computer-readable storage medium, the computer-readable storage medium including instructions that when executed by a computer, cause the computer to: obtain historical entity data from one or more databases, the historical entity data associated with attributes associated with one or more entities; generate an entity matrix based on a clustering of the historical entity data; partition the entity matrix into one or more disjointed groups of records based on multi-pass blocking of the attributes associated with the one or more entities; cluster the one or more disjointed groups of records based on one or more similarity metrics between each of the one or more disjointed groups of records; generate an entity graph for the one or more entities based on the clustering; create an entity index for an entity based on the entity graph; and resolve an entity query of a requestor as matching the entity.

Aspect 16. The computer-readable storage medium of aspect 15, wherein resolving the identity of the requestor further comprises: receive an entity verification request for access to an entity profile, wherein the entity verification request includes current entity data of the requestor; determine at least one linking key associated with the current entity data of the requestor; match the at least one linking key with the entity index for the entity; and provide the requestor access to the entity profile.

Aspect 17. The computer-readable storage medium of aspect 15, wherein generating the entity graph further comprises: input the one or more disjointed groups of records and one or more similarity metrics into a machine learning model; receive a clustering output from the machine learning model; and generate the entity graph based on the clustering output.

Aspect 18. The computer-readable storage medium of aspect 17, wherein the instructions further cause the computer to: receive current entity data associated with the requestor; input the current entity data into the machine learning model; and update the entity graph based on an output from the machine learning model.

Aspect 19. The computer-readable storage medium of aspect 18, wherein the instructions further cause the computer to: update the machine learning model based on the update to the entity graph.

Aspect 20. The computer-readable storage medium of aspect 15, wherein the one or more entities include an individual, and wherein the entity index is a Personal Identification Number associated with the individual.

Aspect 21. A non-transitory computer-readable medium having stored thereon instructions that, when executed by one or more processors, cause the one or more processors to perform operations according to any of aspects 1 to 20.

Aspect 22. An apparatus for image processing, the apparatus comprising one or more means for performing operations according to any of aspects 1 to 20.

What is claimed is:

1. A method comprising:
    obtaining historical entity data from one or more databases, the historical entity data associated with attributes associated with one or more entities;
    generating an entity matrix based on a clustering of the historical entity data;
    partitioning the entity matrix into disjointed groups of records based on multi-pass blocking of the attributes associated with the one or more entities;
    clustering the disjointed groups of records based on one or more similarity metrics to generate one or more clusters, wherein the one or more similarity metrics indicate respective levels of similarity between at least a pair of the disjointed groups of records, and wherein the clustering includes filtering out a subset of the disjointed groups of records based on the one or more similarity metrics;
    generating an entity graph for the one or more entities based on the one or more clusters;
    creating an entity index for an entity based on the entity graph; and
    resolving an entity query of a requestor as matching the entity.

2. The method of claim 1, wherein resolving the entity query of the requestor includes:
    receiving an entity verification request for access to an entity profile, wherein the entity verification request includes current entity data of the requestor;
    identifying at least one linking key associated with the current entity data of the requestor;
    matching the at least one linking key with the entity index for the entity; and
    providing the requestor with access to the entity profile.

3. The method of claim 1, wherein generating the entity graph includes:
    inputting the disjointed groups of records and the one or more similarity metrics into a machine learning model;
    receiving a clustering output from the machine learning model; and
    generating the entity graph based on the clustering output.

4. The method of claim 3, further comprising:
    receiving current entity data associated with the requestor;
    inputting the current entity data into the machine learning model; and
    updating the entity graph based on an output from the machine learning model.

5. The method of claim 4, further comprising:
    updating the machine learning model based on the update to the entity graph.

6. The method of claim 1, wherein the one or more entities include an individual, and wherein the entity index is a Personal Identification Number associated with the individual.

7. The method of claim 1, wherein the attributes associated with the one or more entities includes at least one of a name, address, date of birth, gender, phone number, email address, or device identification.

8. A computing apparatus comprising:
    a memory storing instructions; and
    a processor, wherein execution of the instructions by the processor causes the processor to:
        obtain historical entity data from one or more databases, the historical entity data associated with attributes associated with one or more entities;
        generate an entity matrix based on a clustering of the historical entity data;
        partition the entity matrix into disjointed groups of records based on multi-pass blocking of the attributes associated with the one or more entities;
        cluster the disjointed groups of records based on one or more similarity metrics to generate one or more clusters, wherein the one or more similarity metrics indicate respective levels of similarity between at least a pair of the disjointed groups of records, and wherein the clustering includes filtering out a subset of the disjointed groups of records based on the one or more similarity metrics;
        generate an entity graph for the one or more entities based on the one or more clusters;
        create an entity index for an entity based on the entity graph; and
        resolve an entity query of a requestor as matching the entity.

9. The computing apparatus of claim 8, wherein, to resolve the entity query of the requestor, the execution of the instructions by the processor causes the processor to:
    receive an entity verification request for access to an entity profile, wherein the entity verification request includes current entity data of the requestor;
    identify at least one linking key associated with the current entity data of the requestor;
    match the at least one linking key with the entity index for the entity; and
    provide the requestor with access to the entity profile.

10. The computing apparatus of claim 8, wherein, to generate the entity graph, the execution of the instructions by the processor causes the processor to:
    input the disjointed groups of records and the one or more similarity metrics into a machine learning model;
    receive a clustering output from the machine learning model; and
    generate the entity graph based on the clustering output.

11. The computing apparatus of claim 10, wherein the execution of the instructions by the processor causes the processor to:

receive current entity data associated with the requestor;

input the current entity data into the machine learning model; and update the entity graph based on an output from the machine learning model.

12. The computing apparatus of claim 11, wherein the execution of the instructions by the processor causes the processor to:

update the machine learning model based on the update to the entity graph.

13. The computing apparatus of claim 8, wherein the one or more entities include an individual, and wherein the entity index is a Personal Identification Number associated with the individual.

14. The computing apparatus of claim 8, wherein the attributes associated with the one or more entities includes at least one of a name, address, date of birth, gender, phone number, email address, or device identification.

15. A non-transitory computer-readable storage medium having embodied thereon a program, wherein the program is executable by a processor to perform a method comprising:

obtaining historical entity data from one or more databases, the historical entity data associated with attributes associated with one or more entities;

generating an entity matrix based on a clustering of the historical entity data;

partitioning the entity matrix into disjointed groups of records based on multi-pass blocking of the attributes associated with the one or more entities;

clustering the disjointed groups of records based on one or more similarity metrics to generate one or more clusters, wherein the one or more similarity metrics indicate respective levels of similarity between at least a pair of the disjointed groups of records, and wherein the clustering includes filtering out a subset of the disjointed groups of records based on the one or more similarity metrics;

generating an entity graph for the one or more entities based on the one or more clusters;

creating an entity index for an entity based on the entity graph; and resolving an entity query of a requestor as matching the entity.

16. The non-transitory computer-readable storage medium of claim 15, wherein resolving the entity query of the requestor includes:

receiving an entity verification request for access to an entity profile, wherein the entity verification request includes current entity data of the requestor;

identifying at least one linking key associated with the current entity data of the requestor;

matching the at least one linking key with the entity index for the entity; and providing the requestor with access to the entity profile.

17. The non-transitory computer-readable storage medium of claim 15, wherein generating the entity graph includes:

inputting the disjointed groups of records and the one or more similarity metrics into a machine learning model;

receiving a clustering output from the machine learning model; and generating the entity graph based on the clustering output.

18. The non-transitory computer-readable storage medium of claim 17, further comprising:

receiving current entity data associated with the requestor;

inputting the current entity data into the machine learning model; and updating the entity graph based on an output from the machine learning model.

19. The non-transitory computer-readable storage medium of claim 18, further comprising:

updating the machine learning model based on the update to the entity graph.

20. The non-transitory computer-readable storage medium of claim 15, wherein the one or more entities include an individual, and wherein the entity index is a Personal Identification Number associated with the individual.

* * * * *